US007518714B2

(12) United States Patent
Voeller et al.

(10) Patent No.: US 7,518,714 B2
(45) Date of Patent: *Apr. 14, 2009

(54) VEHICLE SERVICE SYSTEM WITH VARIABLE-LENS IMAGING SENSORS

(75) Inventors: David A. Voeller, St. Louis, MO (US); Timothy A. Strege, Sunset Hills, MO (US)

(73) Assignee: Hunter Engineering Company, Bridgeton, MO (US)

( * ) Notice: Subject to any disclaimer, the term of this patent is extended or adjusted under 35 U.S.C. 154(b) by 58 days.

This patent is subject to a terminal disclaimer.

(21) Appl. No.: 11/400,005

(22) Filed: Apr. 7, 2006

(65) Prior Publication Data

US 2006/0227567 A1 Oct. 12, 2006

Related U.S. Application Data

(60) Provisional application No. 60/669,040, filed on Apr. 7, 2005.

(51) Int. Cl.
*G01B 11/26* (2006.01)
(52) U.S. Cl. .................................. 356/155; 356/139.09
(58) Field of Classification Search ............ 356/139.09, 356/155
See application file for complete search history.

(56) References Cited

U.S. PATENT DOCUMENTS 4,286,839 A * 9/1981 Ilzig et al. .................... 362/552
4,302,104 A 11/1981 Hunter
5,018,853 A 5/1991 Hechel et al.
5,488,471 A 1/1996 McClenahan et al.
5,519,489 A * 5/1996 McClenahan et al. .. 356/139.09
5,598,358 A * 1/1997 Gender et al. ............... 702/105
5,724,743 A * 3/1998 Jackson ....................... 33/288
6,064,750 A 5/2000 January et al.
6,298,284 B1 10/2001 Burns, Jr. et al.
6,313,911 B1 * 11/2001 Stieff ..................... 356/139.09
6,894,771 B1 5/2005 Dorrance et al.
2002/0189115 A1 * 12/2002 Jackson et al. ................ 33/286
2004/0165180 A1 * 8/2004 Voeller et al. .......... 356/139.09
2005/0113912 A1 * 5/2005 Feenstra et al. ............. 623/6.13
2006/0045501 A1 * 3/2006 Liang et al. .................. 396/62
2006/0106426 A1 * 5/2006 Campbell ..................... 607/3
2008/0007722 A1 * 1/2008 Golab et al. ........... 356/139.09

* cited by examiner

*Primary Examiner*—Thomas H Tarcza
*Assistant Examiner*—Timothy A Brainard
(74) *Attorney, Agent, or Firm*—Polster, Lieber, Woodruff & Lucchesi L.C.

(57) ABSTRACT

A optical imaging sensor assembly for a machine-vision vehicle service system comprising a variable lens optical assembly. The variable lens optical assembly is controlled in response to direction from a vehicle service software application to alter an optical characteristic such as a field of view, a lens focal length, or an optical axis alignment to acquire images for use in a vehicle service procedure such as a vehicle wheel alignment procedure, vehicle tire balancing procedure, or tire changing procedure.

27 Claims, 14 Drawing Sheets

FIGURE 8

VEHICLE SERVICE SYSTEM WITH VARIABLE-LENS IMAGING SENSORS

CROSS-REFERENCE TO RELATED APPLICATIONS

The present application is related to, and claims priority from, U.S. Provisional Patent Application Ser. No. 60/669,040 filed on Apr. 7, 2005 which is incorporated herein by reference.

STATEMENT REGARDING FEDERALLY SPONSORED RESEARCH

Not Applicable.

BACKGROUND OF THE INVENTION

The present invention relates to optical sensors utilized in conjunction with a vehicle service system to acquire data, and in particular, to an improved optical sensor for use with a vehicle service system, such as a vehicle wheel alignment system, vehicle wheel balancer system, or vehicle tire changing system, which incorporates a variable lens in an optical sensor system, and which is capable of altering a lens configuration to vary a lens characteristic such as a focal length, focus, depth of field, a lens aperture, or an optical pathway.

Vehicle service systems which utilize optical sensors, such as the vehicle wheel alignment systems, vehicle tire changers, and vehicle wheel balancers, generally rely upon optical sensors which incorporate fixed lenses designed to view objects or features within a predetermined field of view. Optical sensors utilizing fixed lenses generally compromise high image resolution and accuracy to accommodate the entire predetermined field of view, even though the objects or features which are of interest generally do not encompass the entire field of view. Rather, the objects or features, such as an alignment target mounted to a vehicle wheel assembly, typically only occupy a small portion of the sensor's field of view. However, since the specific location of the object or feature within the field of view can vary, the optical sensor is required to have a field of view which is substantially larger than the object or feature, enabling the object or feature to be imaged at varied locations.

In vehicle wheel alignment systems, the goal of aligning vehicle wheels to within specific tolerances is important for optimal control of the vehicle and for consistent wear of the vehicle's tires. Alignment is performed primarily by adjusting camber, caster, toe, and steering axis inclination. As part of calculating the alignment angles for the vehicle, the angles of the wheels must be determined. The angles can be determined relative to an external reference, such as found in machine-vision vehicle wheel alignment systems, or relative to the other wheels on the vehicle, such as found in wheel-mounted vehicle wheel alignment systems. It is known that alignment angles can be measured using electro-optical transducers which incorporate solid state detector arrays. In the case of machine-vision vehicle wheel alignment systems, the detector arrays may have multiple columns and rows forming an area to capture a two-dimensional image, and in the case of wheel-mounted alignment systems, the detector array may only need to be linear, having a single row with as few as two receptor elements. In either case, the images formed on the detector arrays must be analyzed meticulously so that accurate alignment angles can be calculated.

Wheel-mounted alignment systems typically provide alignment angle sensor heads on each wheel of the vehicle, with each sensor head including an emitter and a fixed lens receiver that works in combination with at least one other sensor head along the vehicle's sides and across the vehicle. The receiver units may have photodiodes as set forth in U.S. Pat. No. 4,302,104, or a charge coupled device (CCD) as set forth in U.S. Pat. Nos. 5,018,853 and 5,519,489. The emitter units may have a single illumination source as in U.S. Pat. Nos. 4,302,104 and 5,018,853, or may incorporate multiple illumination sources as shown in U.S. Pat. No. 5,488,471. Angles and distances are calculated according to the positions of projected spots or lines that are detected by the linear arrays.

Machine-vision vehicle wheel alignment systems typically use solid state imaging sensors with fixed lenses mounted away from the vehicle to obtain images of wheel-mounted alignment targets. Each alignment target may incorporate an accurately reproduced pattern that has known control features, as set forth in U.S. Pat. No. 6,064,750. The position of the features in the image are found and an orientation of the wheel is calculated there from using well known algorithms. Some machine-vision systems do not use a predefined target but identify either random or predetermined geometric features directly on the wheel or tire of a wheel assembly, such as projected light stripes or the circular wheel rim, and use the distortion of the geometry to determine positions and orientations.

With machine-vision vehicle wheel alignment systems, the sensor imaging requirements are somewhat different from those associated with acquiring images using a standard photographic camera. Very precise measurements must be made at a rate of at least 2 Hz. on static or very nearly static scenes. This requires stable, low-noise images. The accuracy of the measurement depends on the precision with which image features such as spots, edges, centroids, corners, lines or boundaries can be determined. Methods for analyzing the images obtained using a standard area imaging sensor must take into account the possible sources of inaccuracy and compensate for them.

For example, an optical sensor, such as the DSP-600 Vision Sensor, utilized in conjunction with a vehicle wheel alignment system, such as the 611 Wheel Alignment System, both of which are manufactured and sold by Hunter Engineering Co. of Bridgeton, Mo., must have a field of view which is sufficiently large enough to view alignment targets mounted to the rear wheels of vehicles having different wheelbase lengths which range from a predetermined minimum to a predetermined maximum length. Similarly, optical sensors utilized in conjunction with vehicle wheel balancing systems and vehicle tire changing systems must have fields of view which are sufficiently large enough to view wheel rim or tire surfaces for vehicle wheel assemblies having different wheel rim diameters and different tire sizes.

Accordingly, it would be advantageous to provide a vehicle service system, such as a wheel alignment system, a vehicle wheel balancing system, or a vehicle tire changer with compact variable lens imaging sensors which are capable of adjusting one or more lens assembly optical characteristics, such as a field of view or zoom, a lens assembly optical axis, an image focus, a lens assembly aperture, or a lens assembly depth of field.

Fluid-lenses, which utilize an interface between two immiscible fluids having different refractive indices as a lens to focus incoming light have recently been developed as a form of variable lens system. One of the two fluids within the fluid-lens is an electrically conducting aqueous solution, and the other is a non-electrically conductive oil. The fluids are contained within a short tube or cylinder, with transparent end caps. The internal surfaces of the tube wall and one of the end caps are coated with a hydrophobic coating which repels the aqueous solution, resulting in the formation of a hemispherical fluid mass at the opposite end of the tube. The curved transitional interface between the aqueous solution and the oil acts to focus the incoming light in substantially the same manner as a spherically curved lens.

As shown in FIGS. 1A-1C, the shape of the fluid lens may be adjusted by applying an electric field across the hydrophobic coating such that it becomes less hydrophobic, i.e., a process called "electro-wetting", which results from an electrically induced change in the surface-tension of the fluids. As a result of the change in surface-tension, the aqueous solution begins to wet the sidewalls of the tube, altering the radius of curvature of the interface between the two fluids, and hence, the focal length of the lens. By increasing the applied electric field, the initially convex interface can be made completely flat or even concave, resulting in a fluid-lens which transitions smoothly in a controlled manner from being convergent to divergent. An exemplary fluid-lens developed by Philips Research Laboratories in Eindhoven, Netherlands is approximately 3.0 mm in diameter, 2.2 mm in length, and has a focal range from 5.0 cm to infinity.

Combining two or more fluid-lenses along a common optical axis in a stacked or barrel configuration provides the ability to provide a zoom feature similar to that found in traditional optical lens arrangements with moving lens elements. Each fluid-lens in the stack is controlled independently.

The optical axis of a fluid-lens can be altered or tilted by varying the applied voltages about the circumference of the lens, resulting in the interface between the two fluids to distort from a symmetrical convex or concave shape, as biased by the varied applied voltage.

Accordingly, it would be advantageous to provide a vehicle service system, such as a wheel alignment system, a vehicle wheel balancing system, or a vehicle tire changer with compact variable lens imaging sensors, such as fluid-lenses, or a set of repositionable solid lenses, which are capable of adjusting a field of view, adjusting an image focus, altering a depth of field, changing a lens aperture, or varying an optical axis along which an image is viewed.

BRIEF SUMMARY OF THE INVENTION

Briefly stated, in one embodiment, the present invention provides a machine-vision vehicle service system with an improved imaging sensor utilizing a variable lens optical sensor assembly to acquire images associated with a vehicle or vehicle component for purposes of carrying out a vehicle service or inspection procedure.

In a variation of the present invention, a machine vision vehicle service system is provided with a means to control the operation of a variable lens optical sensor assembly to acquire images associated with a vehicle or vehicle component during a vehicle service or inspection procedure. The control means is configured to selectively alter one or more characteristics of the variable lens optical sensor assembly to facilitate acquisition of the associated images.

In an alternate embodiment, the present invention provides a vehicle wheel alignment system with an improved imaging sensor having an adjustable lens characteristic utilizing a variable lens.

In an alternate embodiment, the present invention provides a vehicle wheel balancing system with an improved imaging sensor having an adjustable lens characteristic utilizing a variable lens.

In an alternate embodiment, the present invention provides a vehicle tire changing system with an improved imaging sensor having an adjustable lens characteristic utilizing a variable lens.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 6B is an illustration of the effect of a variable lens in a narrow-angle field of view configuration, i.e. zoomed-in;

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Machine vision vehicle wheel alignment systems such as shown in U.S. Pat. No. 6,298,284 B1 to Burns, Jr. et al., herein incorporated by reference, typically utilize a set of solid state imaging sensors mounted away from a vehicle 10 undergoing an alignment inspection, to obtain images of wheel-mounted alignment targets. As is conventional in the field of machine vision vehicle wheel alignment systems, the alignment targets incorporate accurately reproduced patterns and/or known control features, as set forth in U.S. Pat. No. 6,064,750 to January et al., herein incorporated by reference. The positions of the features in the images are determined by a processing system using well known geometric relationships and mathematical algorithms, from which the position and orientation of the wheels or other vehicle components associated with each alignment target are identified.

Some machine vision vehicle wheel alignment systems, such as shown in U.S. Pat. No. 6,894,771 to Dorrance et al., herein incorporated by reference, do not use predefined alignment targets mounted to the vehicle wheels or components, but rather process images to identify either random or predetermined geometric features directly on the wheel, tire of a wheel assembly, or vehicle component, such as projected light stripes or geometric features. These systems typically use distortion or changes in the observed geometry to determine positions and orientations from which position and orientation measurements or wheel alignment data can be determined.

Figure 1A:
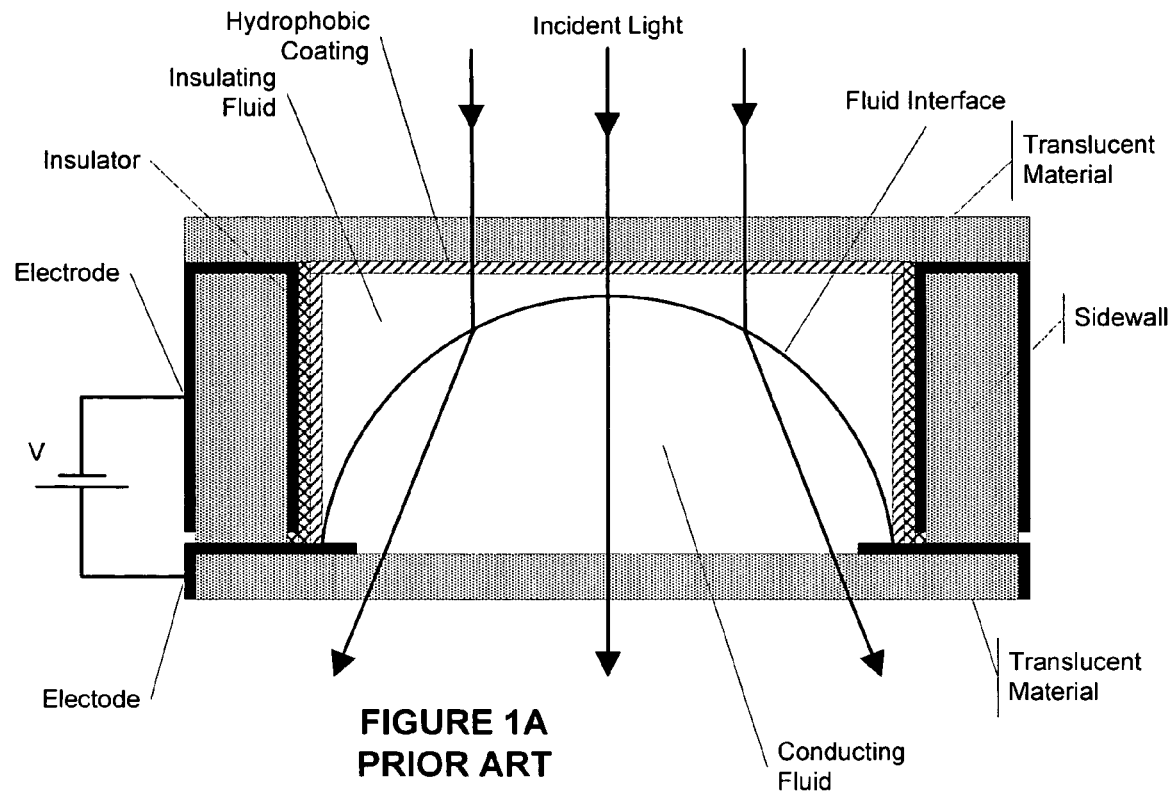
FIG. 1A is an illustration of a prior art fluid-lens in a convex state.
Figure 1B:
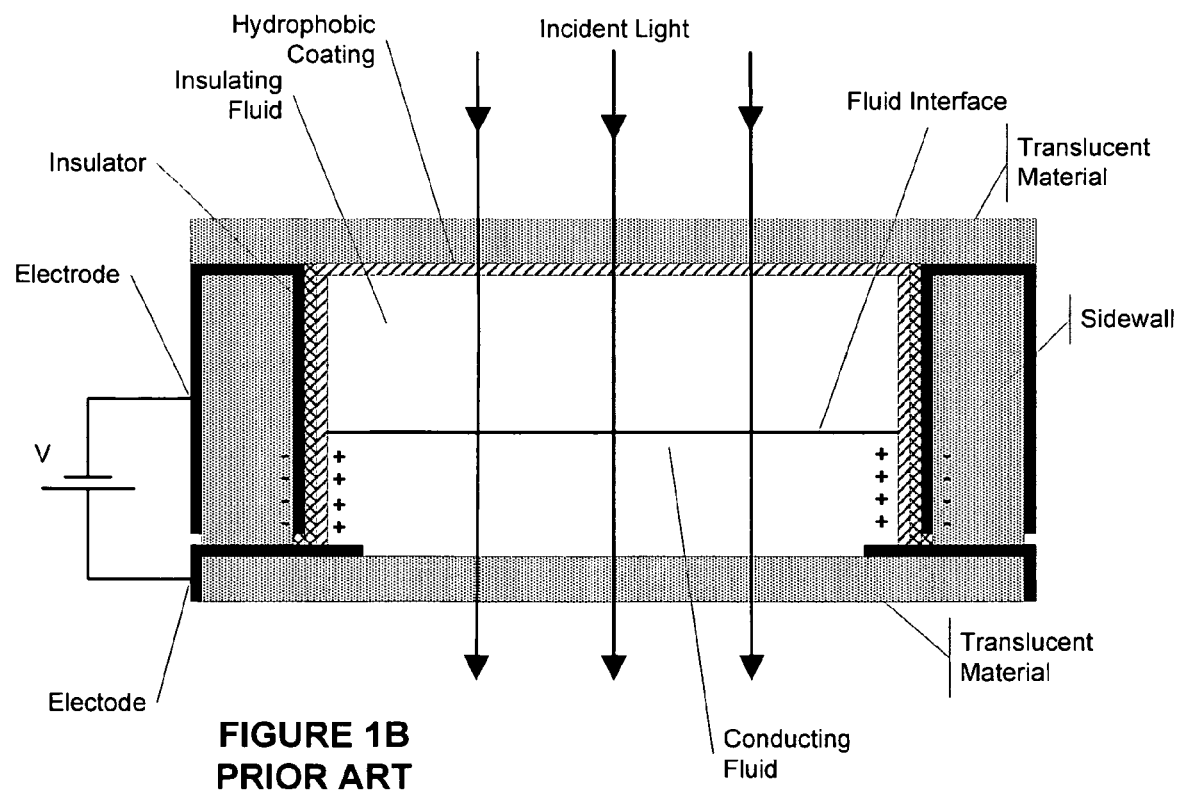
FIG. 1B is an illustration of the prior art fluid-lens of FIG. 1A with an applied voltage resulting in a transitional (flat) state.
Figure 1C:
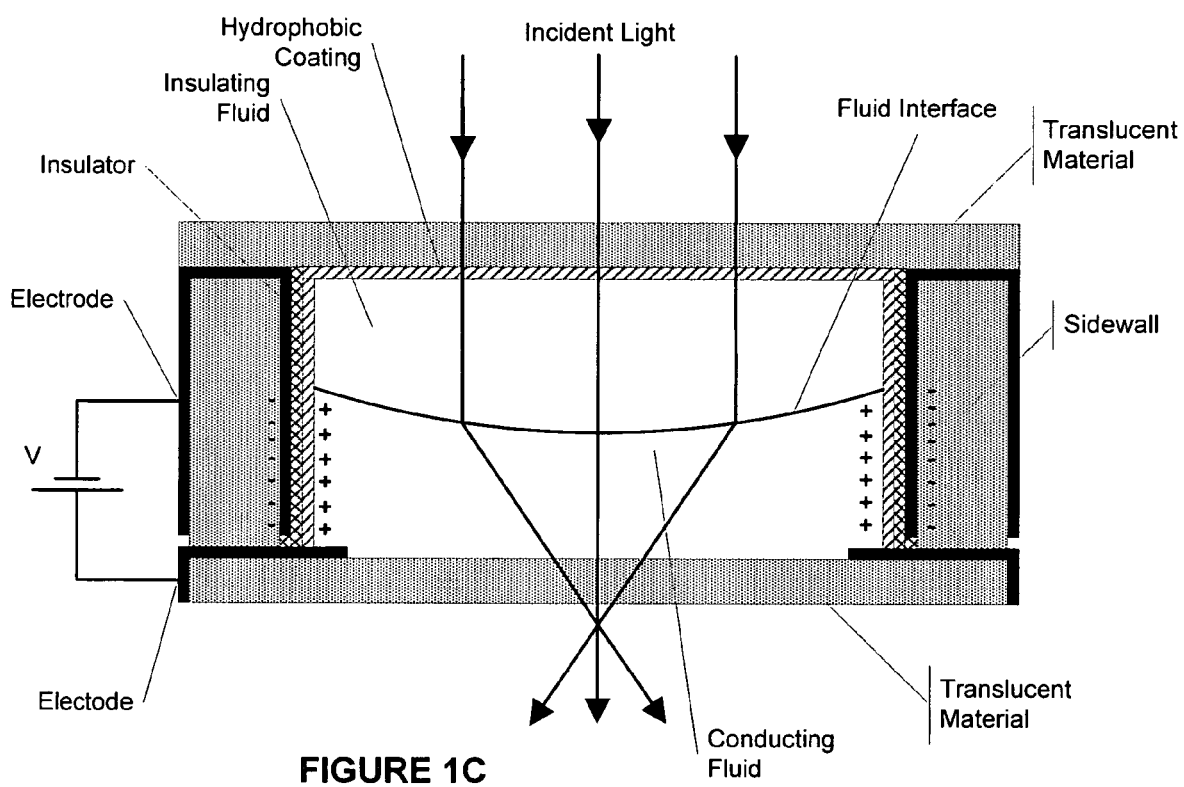
FIG. 1C is an illustration of the prior art fluid-lens of FIG. 1B with an increased applied voltage resulting in a concave state.
Figure 2:
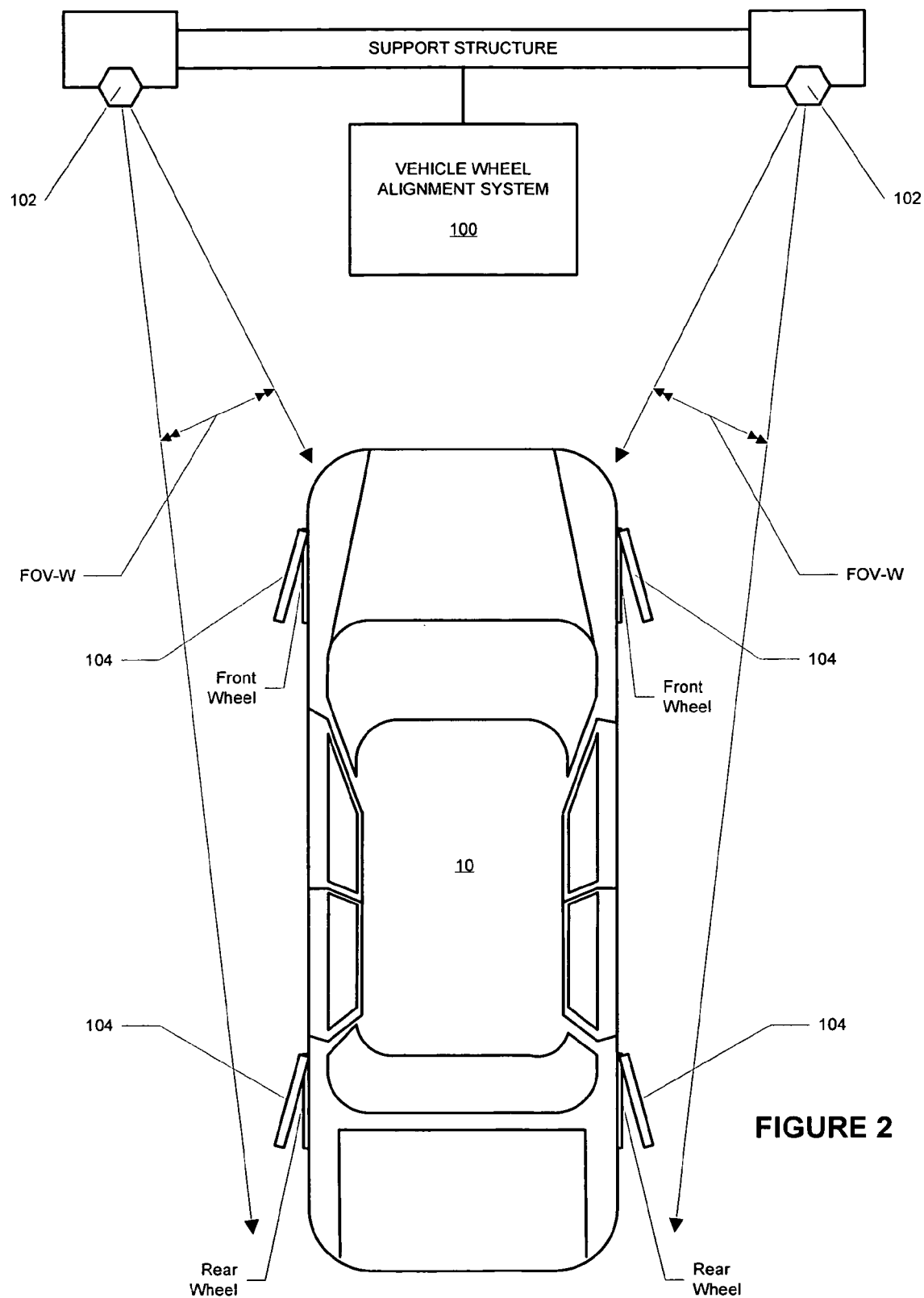
FIG. 2 is an illustration of a vehicle wheel alignment system utilizing variable lens optical sensors of the present invention to locate alignment targets in a wide field of view.
Figure 3:
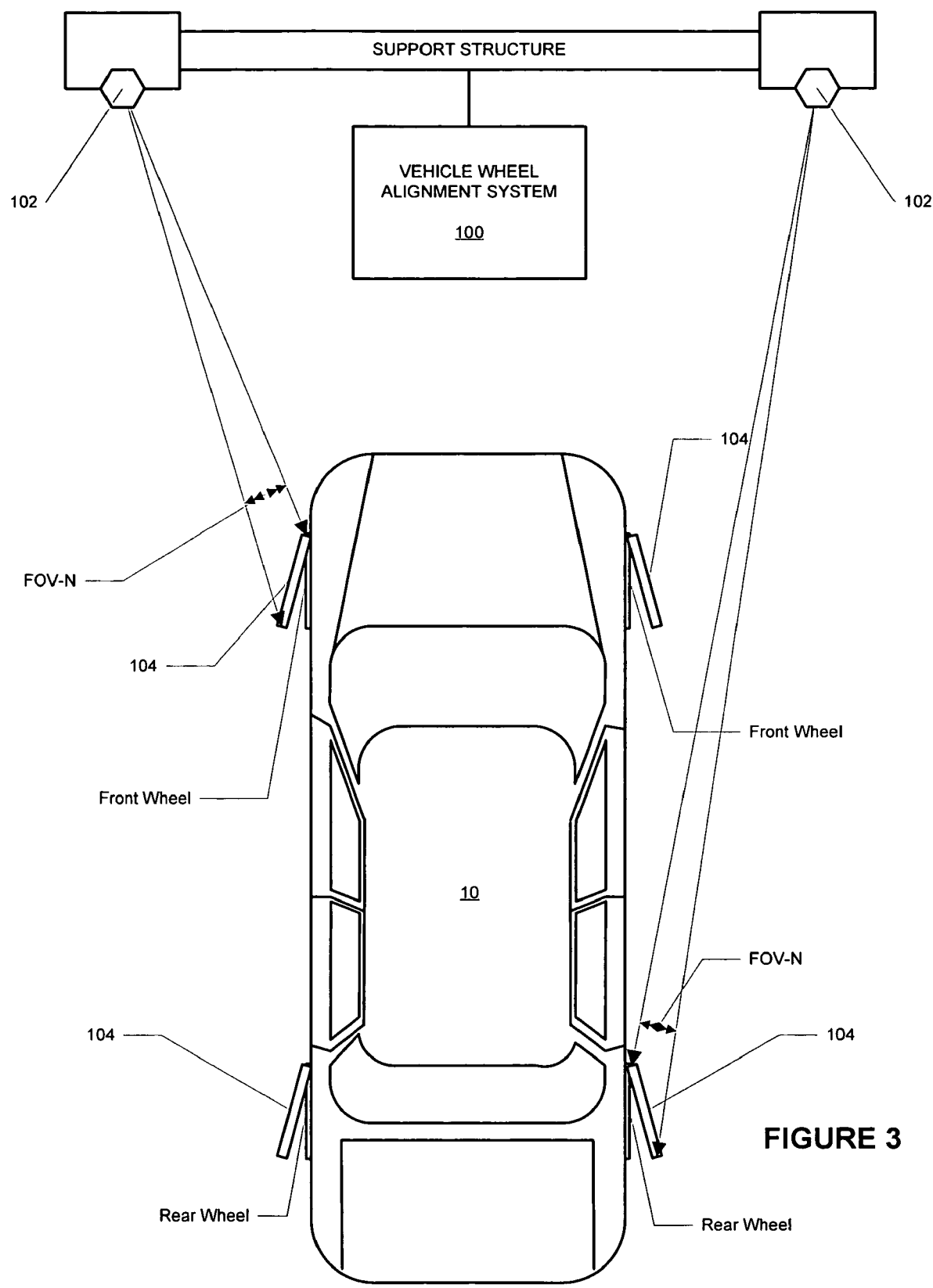
FIG. 3 is an illustration of the wheel alignment system of FIG. 2 utilizing variable lens optical sensors adjusted to narrow fields of view to acquire images of front and rear alignment targets.

In an embodiment of the present invention, such as shown in FIGS. 2 and 3, a machine-vision vehicle wheel alignment system 100 is provided with a set of variable lens imaging sensors 102 in place of the traditional fixed lens imaging sensors to acquire images of alignment targets 104 associated with the wheels or surfaces of a vehicle 10. Each variable lens imaging sensor 102 includes a set of lenses, which may be either mechanically movable solid lenses, or electrically-adjustable boundary fluid-lenses, disposed along an optical axis between the observed field of view and an array of photoreceptor elements, such as a CCD array, a CMOS array, or other type of solid-state array which is responsive to light illumination to generate responsive signals. The variable lens imaging sensors 102 are configured to selectively vary one or more optical characteristics such as, but not limited to, a field of view (zoom), an optical axis along which incident light is received, an image focus, a lens aperture, or a depth of field in response to suitable signals from a control processor of the vehicle wheel alignment system 100.

Figure 4:
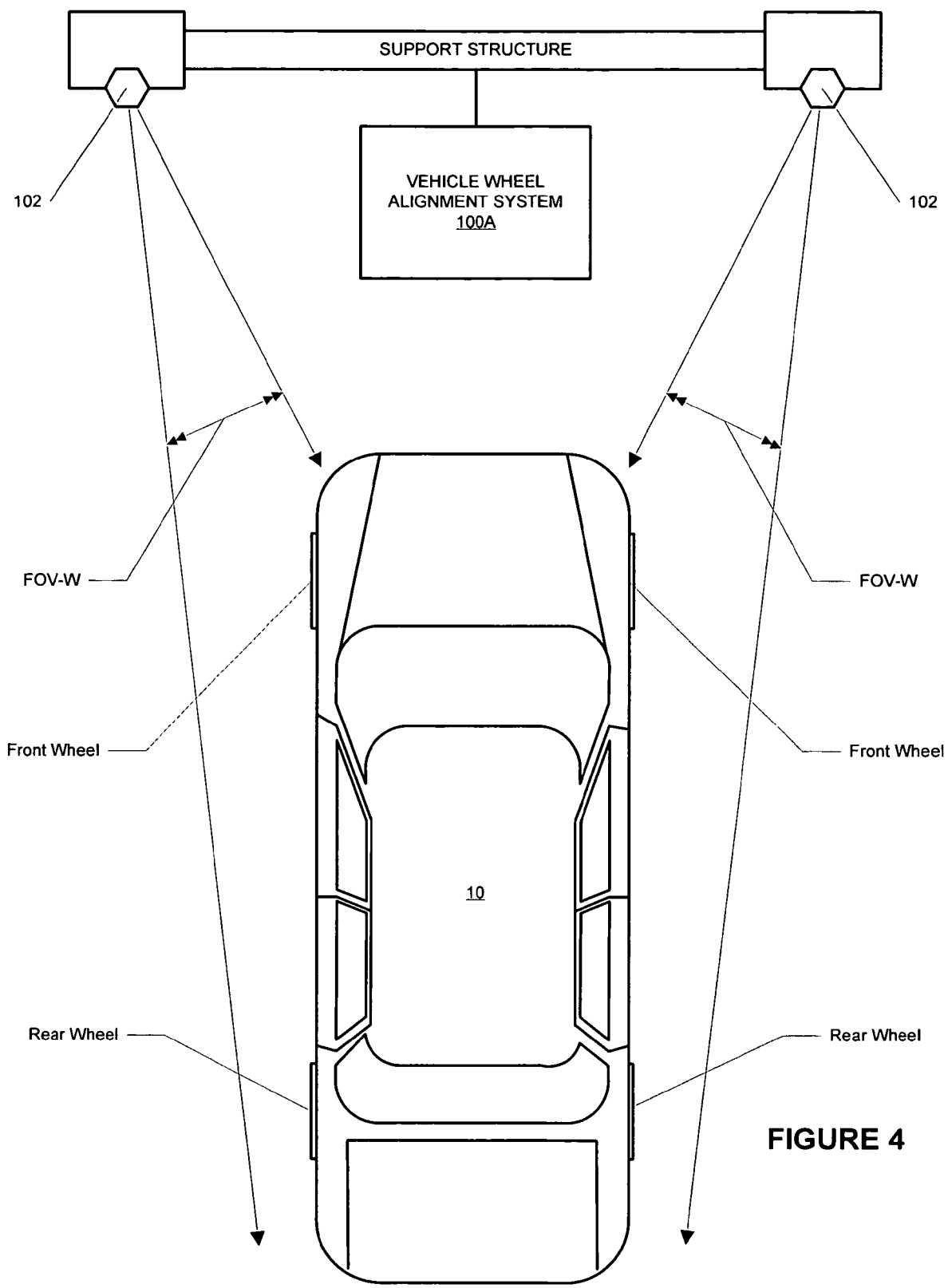
FIG. 4 is an illustration of a vehicle wheel alignment system utilizing variable lens optical sensors of the present invention to locate vehicle wheel assemblies in a wide field of view.
Figure 5:
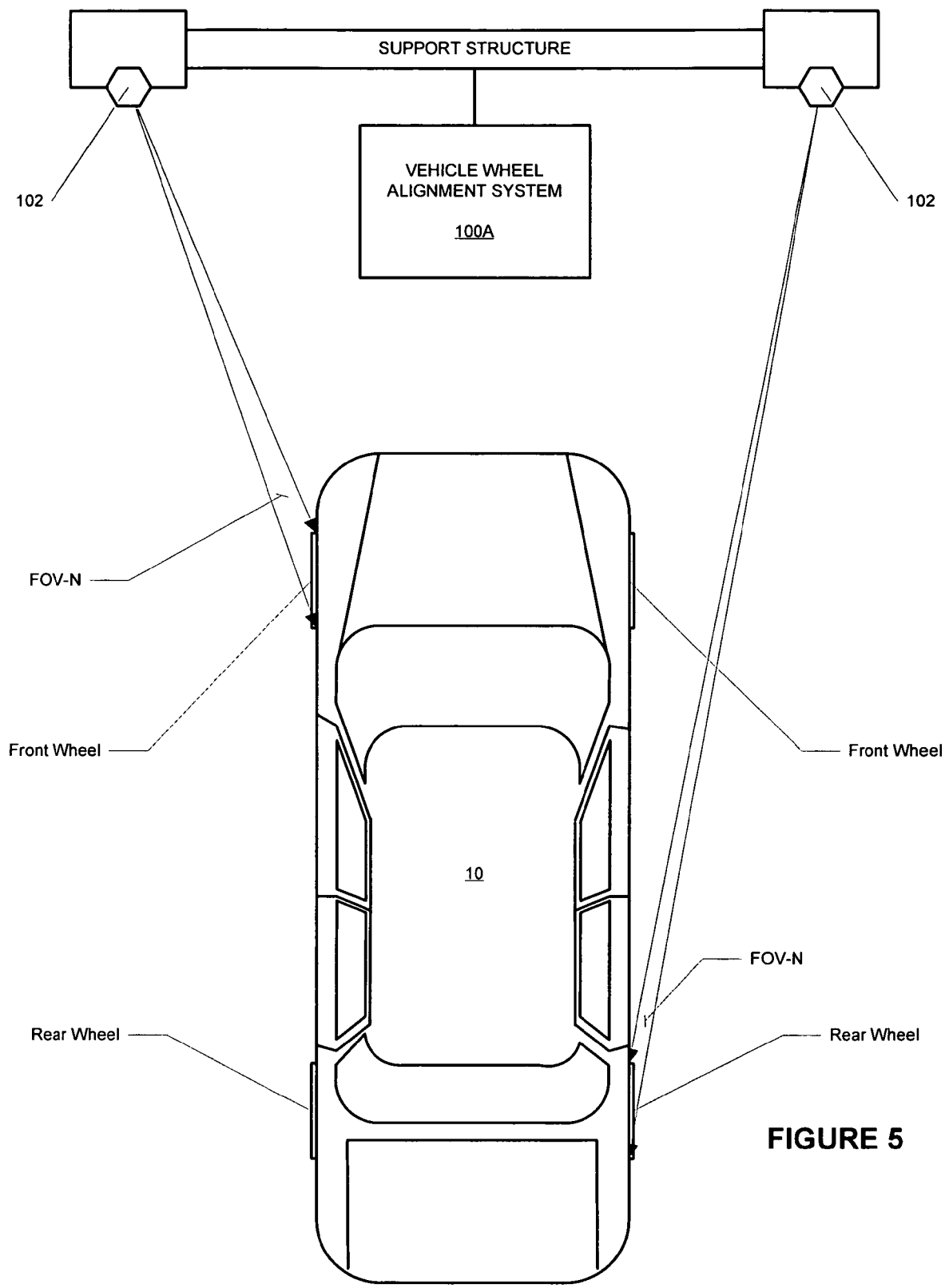
FIG. 5 is an illustration of the wheel alignment system of FIG. 2 utilizing variable lens optical sensors adjusted to narrow fields of view to acquire high resolution images of front and rear vehicle wheel assemblies.

The variable lens imaging sensors 102 may be used to capture high resolution images of an alignment target 104 mounted to a vehicle wheel assembly or other vehicle component such as a suspension member or vehicle body panel. For alternate designs of the vehicle wheel alignment system 100A which do not rely upon alignment targets 104, such as shown in FIGS. 4 and 5, variable lens imaging sensors 102 are configured to provide images of sufficient resolution to yield images directly of the surface of the vehicle 10, the vehicle wheel assemblies, or other vehicle components, which can be used to determine precise component or wheel positions, and subsequently, vehicle alignment parameters or vehicle characteristics.

One characteristic of a variable lens imaging sensor 102 which may be altered is the field of view. The field of view of each variable lens imaging sensor 102 can be varied by altering the configuration of the variable lens elements, such as the shape of the fluid interface in one or more fluid-lens elements disposed within a fluid-lens imaging sensor, or the distances between movable solid lenses within the imaging sensor. This can allow for a wider field of view (FOV-W) which may include a desired object such as an alignment target 104 in a wider range of positions, for example, corresponding to a lift rack range from its highest position to its lowest position. Once the desired object such as an alignment target 104 is found in the wider field of view (FOV-W), as shown in FIGS. 2 and 4, a variable lens imaging sensor 102 may be altered to narrow the field of view (FOV-N) and to adjust an optical axis if required, to "zoom-in" on the alignment target 104 as shown in FIG. 3, vehicle component, or features on a wheel assembly, as shown in FIG. 5. The image resulting from altering the field of view differs from an image obtained by selecting a region of interest within a fixed field of view in that the resolution of the image of the altered field of view will be greater than the resolution of the image of a selected region of interest, which remains unchanged from that of the fixed field of view within which that region of interest lies.

It will be recognized that when "zooming" from a wide field of view (FOV-W) to a narrow field of view (FOV-N), it may be necessary to alter the optical axis of the variable lens imaging sensor 102 to maintain the desired object within the narrow field of view (FOV-N). This may be done mechanically by repositioning one or more of the lenses within the variable lens imaging sensor 102, or by altering a characteristic of a lens of the variable lens imaging sensor 102 as described below. A similar result may be achieved without altering the optical axis of the variable lens imaging sensor 102 itself, by mechanically moving (panning or tilting) the entire variable lens imaging sensor 102 to align the optical axis with the object being viewed.

Figure 6A:
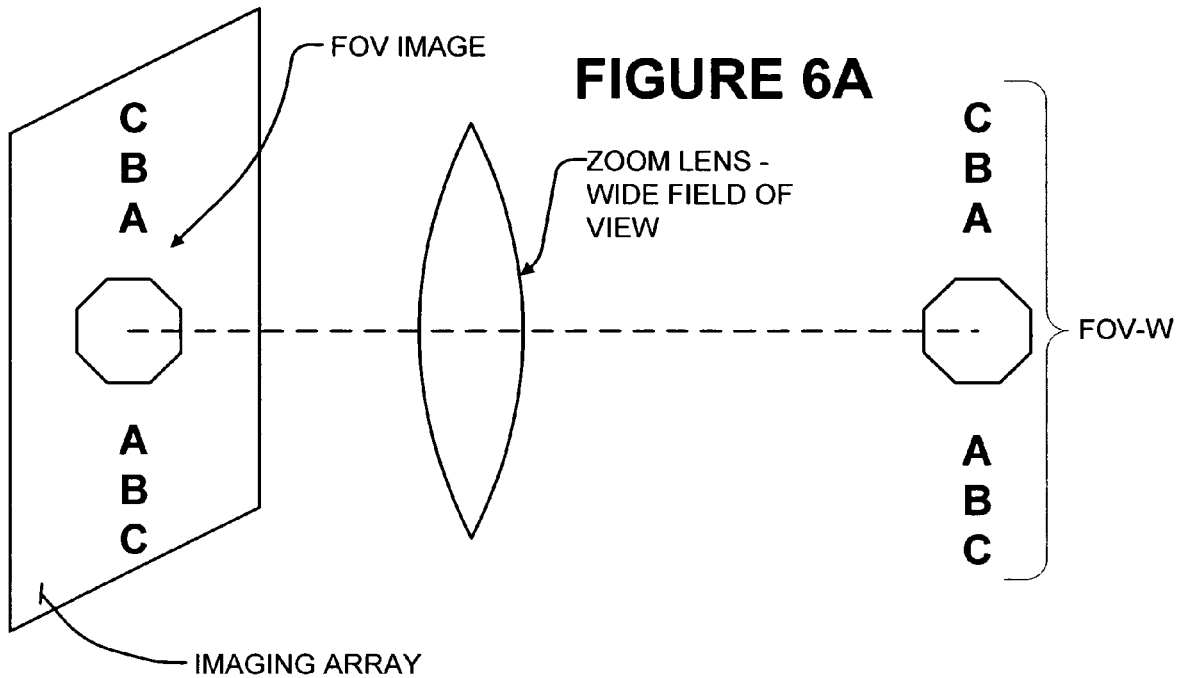
FIG. 6A is an illustration of the effect of a variable lens in a wide-angle field of view configuration; i.e., zoomed-out.
Figure 6B:
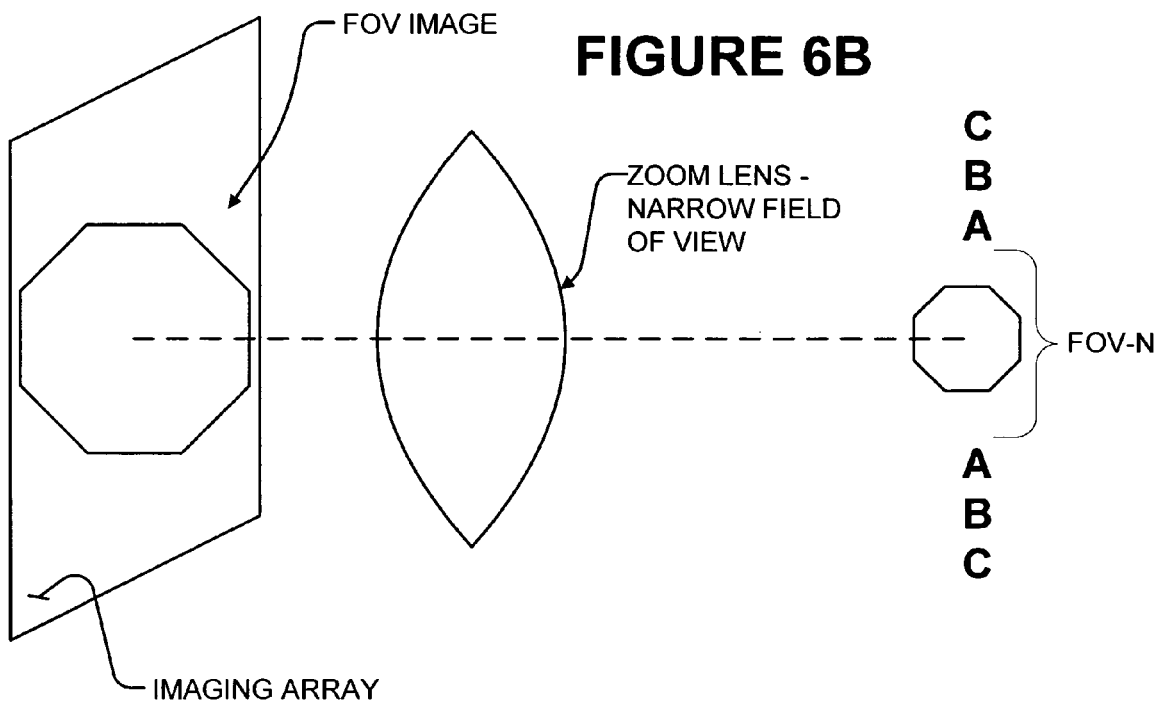

Differences between images projected onto an imaging array by altering a variable lens configuration are shown in FIGS. 6A and 6B. In an initial configuration of the variable lens having a wide field of view FOV-W, the projected image shown in FIG. 6A includes images of objects throughout the field of view. In a second configuration of the variable lens, the field of view FOV-N is narrowed, as shown in FIG. 6B, but maintained on the same optical axis such that the projected image is limited to an image of a small number of features within the original wide field of view FOV-W, such as an alignment target 104, which now occupies the majority of the field of view.

The ability of variable lens imaging sensors 102 to "zoom in" on a region of interest or object within a field of view provides increased functionality in a vehicle wheel alignment sensor application. One variable lens imaging sensor 102 may be utilized to acquire images of both the front and rear alignment targets 104 or of front and rear wheel assemblies of one side of a vehicle 10 during a vehicle wheel alignment procedure, provided the zoom range of the lens assembly is sufficient to enable acquisition of images having sufficient resolution over the entire range of vehicle wheelbases.

Variable lens imaging sensors 102 which utilize fluid-lens systems offer additional advantages. The ability of fluid-lenses to alter or tilt the orientation of the optical axis of an associated field of view additionally provides increased functionality to a vehicle wheel alignment sensor. A fluid-lens type variable lens imaging sensor 102 may be utilized to acquire images of alignment targets 104, vehicle wheel assemblies, component parts on a vehicle 10 which is disposed on a vehicle lift, or lift components themselves, over the entire vertical range of motion of the vehicle lift, eliminating the need to physically move or maintain the fluid-lens type variable lens imaging sensors 102 in a fixed relationship to the vehicle lift height. As the vehicle lift (and associated vehicle 10) move up or down, the vehicle wheel alignment system may be configured with a suitable control means to configure the fluid-lens type variable lens imaging sensor 102 to maintain the optical axis of the fluid-lens type variable lens imaging sensor 102 on an identified target in a field of view, such as an alignment target 104 or wheel assembly. The control means may be a set of software instructions executed by a central processing unit of the vehicle wheel alignment system, or may be a dedicated camera control logic circuit which is operatively coupled to the imaging sensor 102.

A fluid-lens type variable lens imaging sensor 102 of the present invention is well suited for use with machine-vision vehicle wheel alignment systems in which the placement of imaging sensors relative to the sides of the vehicle 10 is critical to obtain a suitable image for processing. Imaging sensors which are disposed adjacent the sides of the vehicle 10 typically require short focal length lenses with wide fields of view, such as fish-eye lenses. With solid lenses, the difficulty of design, cost to manufacture, and difficulty in calibration for lens aberrations increases in proportion to decreases in the lens focal length. An imaging sensor incorporating a fluid-lens type variable lens imaging sensor 102 provides the required short focal length necessary to acquire images of nearby objects, and provides the additional ability to alter or tilt the associated optical axis to acquire suitable images of alignment targets 104, vehicle components, or vehicle wheel assemblies which are not directly aligned with the physical axis of the imaging sensor, reducing the need for a wide field of view FOV-W.

Vehicle service system imaging sensors must be calibrated prior to use to ensure the required levels of image accuracy. Fluid-lens type variable lens imaging sensors 102 are sensitive to environmental variables such as temperature and pressure, and hence must be calibrated for these variables. If this calibration is not done accurately, machine vision measurements will not be as accurate. This calibration is typically done at the time of assembly of the imaging sensor 102, under controlled conditions for maximum accuracy. Using a variable lens can effect the calibration since the lens assembly can be adjusted to multiple focal lengths. In an embodiment of the present invention, an imaging sensor 102 using a variable lens is calibrated at multiple variations of a lens configuration. In operation, it is desirable to use the imaging sensor 102 at or near the "zoom positions" for which it was calibrated at for maximum accuracy.

For example, to compensate a fluid-lens type variable lens imaging sensor 102 for temperature changes, an intrinsic calibration is done at a three different temperatures for each focal length (voltage). This provides sufficient information for the intrinsic calibration values to be characterized by a temperature curve. During use in an automotive service environment, the effective temperature for the fluid-lens type variable lens imaging sensor 102 is then measured, and provided as an input to the processing system where the intrinsic calibration of the fluid-lens type variable lens imaging sensor 102 is adjusted based on the measured temperature.

For some types of fluid-lens type variable lens imaging sensors 102, the "zooming" attribute of the lens may be adjusted using pressure instead of an applied voltage. For fluid-lens type variable lens imaging sensors 102 which utilize pressure to alter the lens characteristics, the intrinsic calibration of the lens may have to be adjusted based on an atmospheric pressure characterization curve similar to the temperature curve described above. Intrinsic calibration may be done at three different atmospheric pressures and a characterization curve may be created based on the pressures and the corresponding intrinsic calibration constants.

The focal length of the fluid-lens type variable lens imaging sensor 102 is based on a given voltage or pressure, and may have to be adjusted for temperature and pressure using characterization curves as discussed above. Without regard to pressure or temperature, the intrinsic calibration constants for different focal lengths of a fluid-lens type variable lens imaging sensor 102 may be characterized using a curve so that the focal length of the lens can be adjusted from a first intrinsic calibration position to a second intrinsic calibration constant position and anywhere in between, beyond, or before. In the field, temperature, applied lens voltage, pressure, or position, and possibly atmospheric pressure may be taken into account when determining how the optical energy representing an observed alignment target 104 is passing through the lens.

A variable lens characterization method of the present invention includes the following sequence of steps:
1. Determine the intrinsic calibration constants which characterize the variable lens assembly 102 at an initially selected setting, such as a zoomed-in focal length;
2. Optionally determine the intrinsic calibration constants which characterize the variable lens assembly 102 at a selected intermediate setting;
3. Determine the intrinsic calibration constants which characterize the variable lens assembly 102 at a final selected setting, such as a zoomed-out focal length;
4. For each set of intrinsic calibration constants, create and store an equation or characterization, such as a $2^{nd}$ order polynomial or a look-up-table that describes the change in the intrinsic calibration constants as the variable (voltage, pressure, mechanical position, temperature, etc.) associated with the selected setting of the variable lens assembly 102 changes.

Once the intrinsic calibration constants for a variable lens assembly 102 are described and/or stored, they may be applied as needed to calibrate images acquired by the lens assembly 102 at different settings during use. One of ordinary skill in the art of imaging optics will recognize that a variety of different intrinsic calibration procedures may be utilized, and that a variety of different methods may be employed to determine these values.

Figure 7:
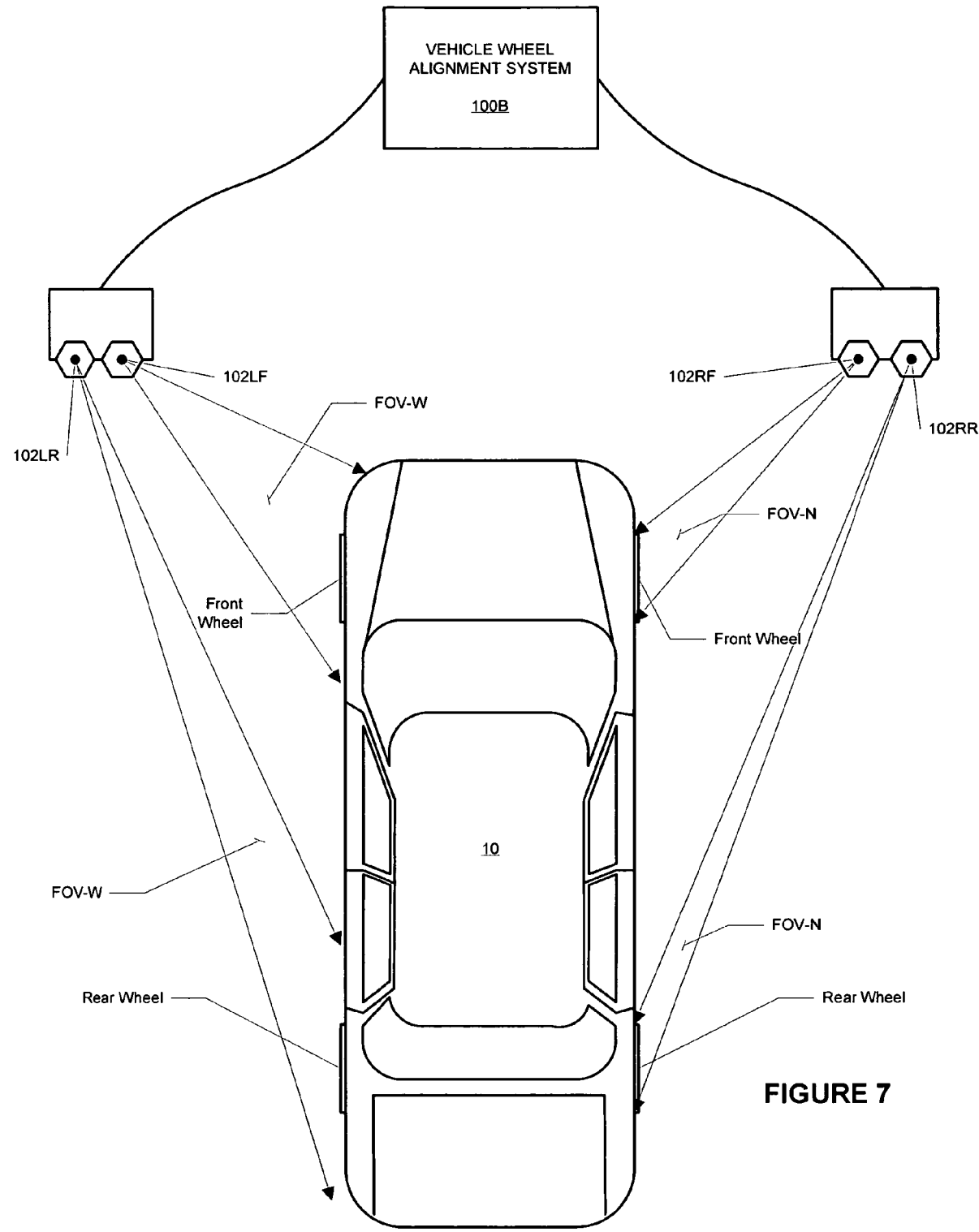
FIG. 7 is an illustration of the wheel alignment system utilizing sensor assemblies which incorporate a pair of variable lens optical sensors on each side of a vehicle.

While the embodiments of the vehicle wheel alignment system 100 illustrated in FIGS. 2-5 illustrate the use of only one variable lens imaging sensor 102 for each side of the vehicle 10, those of ordinary skill in the art will recognize that the variable lens imaging sensors 102 may be utilized in a wide variety of vehicle wheel alignment system configurations, in substantially the same configurations as are found with area-imaging camera sensors. For example, an embodiment shown in FIG. 7 illustrates a vehicle wheel alignment system 100B configured with two independently disposed imaging systems linked to a processing system, one configured to view the left side of the vehicle with a pair of variable lens imaging sensors 102LF, 102LR, and one to view the right side of the vehicle with a second pair of variable lens imaging sensors 102RF, 102RR. The field of view for each variable lens imaging sensor 102LF, 102LR, 102RF, and 102RR is adjustable between a wide field of view (FOV-W) for locating objects, and a narrow field of view (FOV-N) or selected region of interest within the wide field of view for acquiring higher resolution images of located objects.

Figure 8:
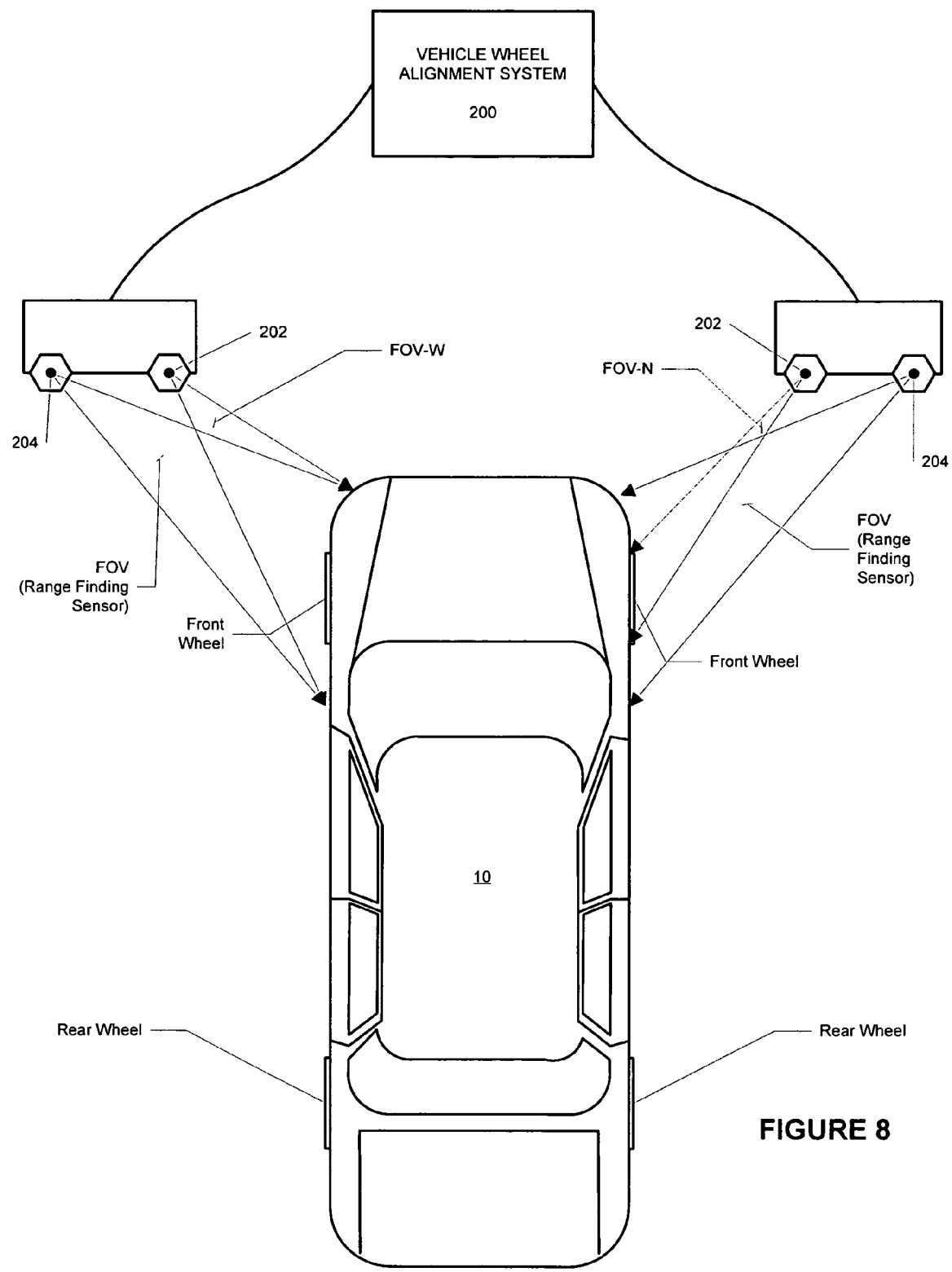
FIG. 8 is an illustration of the wheel alignment system utilizing sensor assemblies which incorporate a variable lens optical sensor in combination with a range finding optical sensor on each side of a vehicle.

In an alternate configuration, illustrated in FIG. 8, a vehicle service system 200 of the present invention may utilize variable lens imaging sensors 202 in combination with distance or range-finding imaging sensors 204 having wide fields of view to facilitate the determination of measurements of objects within the fields of view from the resulting images. Vehicle service systems, including vehicle wheel alignment systems, vehicle tire changers, and vehicle wheel balancing systems incorporating distance or range-finding imagers are described in detail in U.S. Patent Application Publication No. 2004/0165180 A1, herein incorporated by reference.

Vehicle wheel alignment systems which determine alignment angle measurements directly from images of the vehicle wheel assemblies typically rely upon predetermined dimensions of an observed feature associated with the wheel assembly in an acquired image of the vehicle wheel assembly, such as the wheel rim diameter or a predetermined sticker. The dimensions of the observed feature may provide a basis from which distances between the imaging sensor and the wheel assembly can be identified. In order to determine the dimensions of an observed feature, the acquired images must have sufficient image resolution. However, while typical distance or range-finding imaging sensors 204 provide a measure of distance to objects viewed on an optical axis of the sensor, these types of imagers generally have a low image resolution.

To provide a high-resolution image of an object such as a vehicle wheel assembly together with an accurate measure of the distance to the object, an embodiment of the machine vision vehicle wheel alignment system 200 of the present invention provides a variable lens imaging sensor 202 mounted in a known location relative to a distance or range-finding imaging sensor 204. During operation, the distance or range-finding imager 204 is utilized to acquire a low-resolution image of a target object, such as a vehicle wheel assembly, and to acquire an accurate distance measurement from the imager 204 to the target object. The variable lens imaging sensor 202, which is mounted in the known location relative to the distance or range-finding imager 204, is then utilized to acquire a high-resolution image of the same target object. Utilizing a known relationship between the distance or range-finding imager 204 and the variable lens imaging sensor 202, an accurate measure of distance associated with the high-resolution image may be determined from the measured distance associated with the low-resolution image, eliminating the need for mounting target objects or stickers of predetermined dimensions on the vehicle wheel assembly or other observed objects.

Figure 9A:
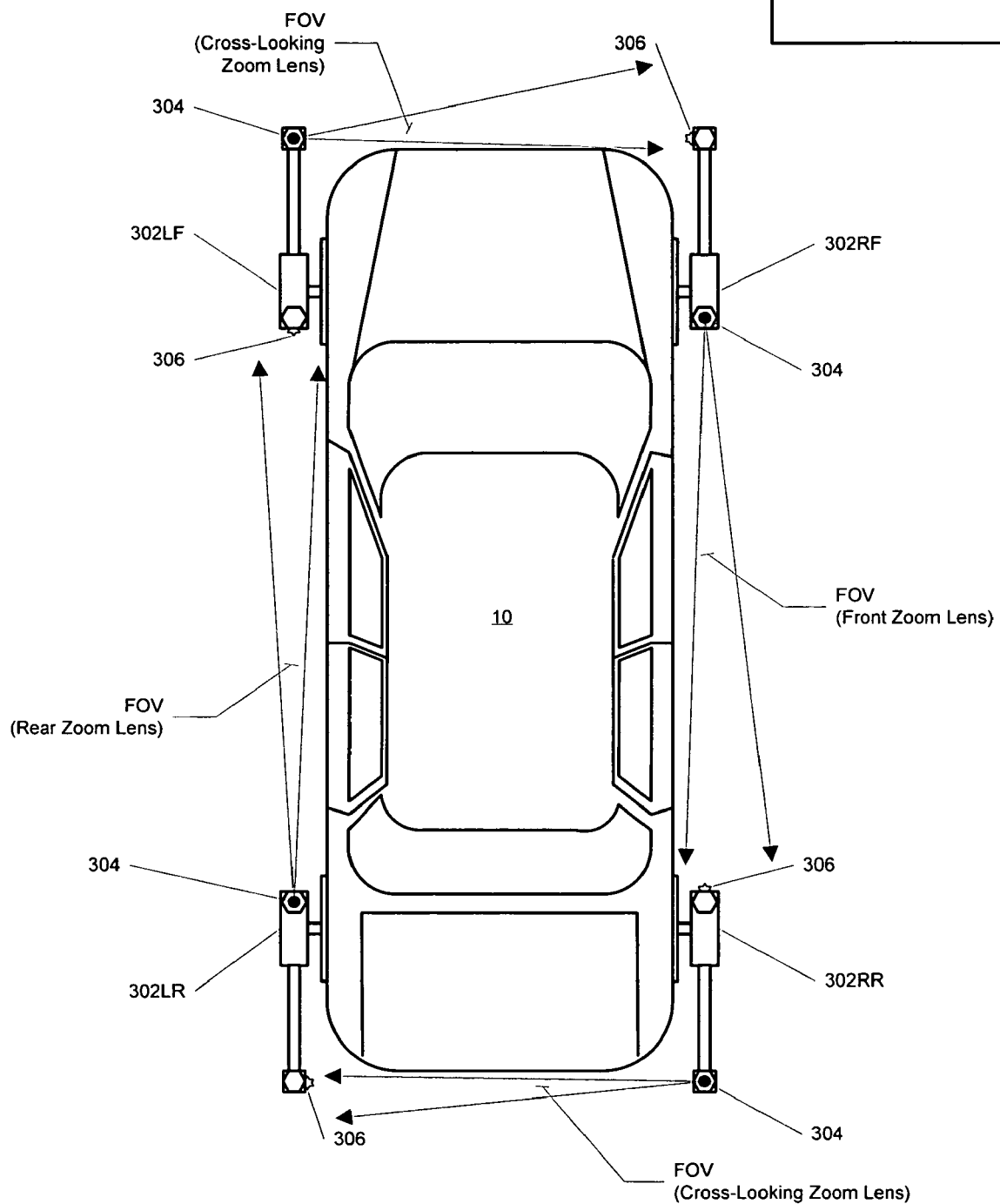
FIG. 9A is an illustration of a vehicle wheel alignment system utilizing wheel mounted sensor assemblies incorporating variable lens optical sensors.
Figure 9B:
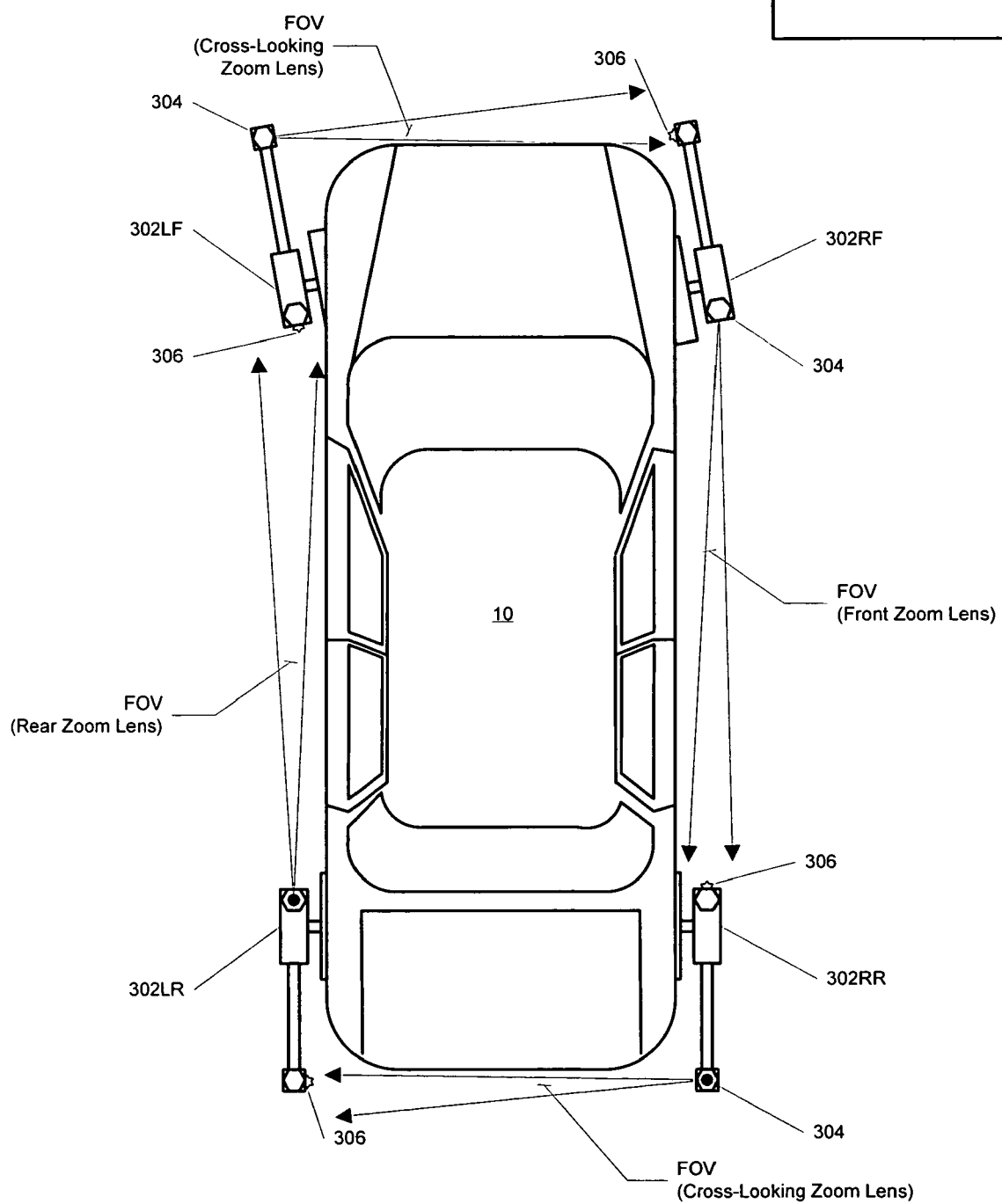
FIG. 9B is an illustration of a vehicle wheel alignment system utilizing wheel mounted sensor assemblies incorporating fluid-lens optical sensors with adjustable optical axis.

In an alternate embodiment of the present invention shown in FIGS. 9A and 9B, a vehicle wheel alignment system 300 is provided with a set of wheel-mounted alignment angle transducers 302 each having variable lens imaging sensors 304, such as those employing fluid-lenses, in place of conventionally configured fixed lens imaging sensors. The wheel-mounted alignment angle transducers 302 are configured to operate in cooperative pairs between transducers 302 mounted to vehicle wheels on one side of a vehicle, and between transducers 302 mounted to vehicle wheels on opposite ends of a common axle. The transducers 302 each include emitter units 306, which may have a single illumination source as in U.S. Pat. Nos. 4,302,104 and 5,018,853 or multiple illumination sources as in U.S. Pat. No. 5,488,471. Data may be communicated to the vehicle wheel alignment system 300 from the transducers 302 via any of a variety of suitable communication pathways, include data cables or wireless transmissions.

The specific number and arrangement of emitters may be varied as is understood by those of ordinary skill in the art of vehicle wheel alignment. Angles and distances are calculated by the vehicle wheel alignment system 300 based on the observed positions of projected spots or lines that are detected by the optical sensors associated with the variable lens imaging sensors 304 on each transducer in a cooperative pair. For example, a transducer unit 302LF on the front left wheel of a vehicle will emit optical energy towards a transducer unit 302RF on the front right wheel, and towards a transducer unit 302LR on the rear left wheel. The transducer unit 302LF on the front left wheel will additionally receive optical energy emitted by the transducer unit 302RF on the front right wheel, and by the transducer unit 302LR on the rear left wheel. It should be noted that for the sake of clarity, FIG. 9A only illustrates the fields of view of the various transducers in a clock-wise manner about the vehicle 10. Those of ordinary skill in the vehicle wheel alignment field will recognize that an associated set of counter-clockwise fields of view between the transducers 302 exist, but are not shown in FIG. 9A.

The ability of a fluid-lens imaging sensor 304 to alter or tilt the optical axis along which incident light is received further enables the transducers 302 to accommodate vehicles of different track widths, and to facilitate angle measurements during steered vehicle wheel turning procedures. For example, as shown in FIG. 9B angular measurements may be acquired between an adjacent pair of transducers 302LF and 302RF during a maximum steering angle turning procedure by altering the optical axis of fluid-lens imaging sensor 304 in transducer 302LF to maintain the emitters 306 disposed on the associated transducer 302RF in a field of view during the steering procedure. Conversely, fluid-lenses may be disposed in front of the emitters 306, to alter the optical axis along which emitted light is projected, accommodating the steering angle of the vehicle wheel. The zooming and focusing features of the fluid-lens imaging sensor 304 further enables a transducer 302 to acquire images of an emitter on a second transducer over a longer distance, accommodating longer wheelbase vehicles such as trucks, without requiring an increase in emitter power or different optical components between passenger car and truck alignment transducers.

Application of variable lenses, such as fluid-lenses, for image acquisition is not limited to vehicle wheel alignment system transducers 102, 202, and 302, but rather, may be incorporated into variety of vehicle service devices, such as vehicle wheel balancers and vehicle tire changing systems.

In alternate embodiments of the present invention, vehicle wheel balancing systems 400 and vehicle tire changing systems 500 which utilize machine vision sensors to acquire images of all, or portions of, vehicle wheel assemblies, are configured with either mechanical variable lens imaging sensors or fluid-lens imaging sensors. The adjustable depth-of-field, focus, and optical axis features of variable lens imaging sensors, enable the improved imaging sensors in vehicle wheel balancing systems 400 and tire changing systems 500 to accommodate a wide range vehicle wheel assembly sizes, while acquiring high-resolution images. The particular physical placement of the variable lens imaging sensor associated with a vehicle wheel balancing system 400 or vehicle tire changing system 500 is dependant upon the particular field of view which is desired, and upon the optical characteristics of the imaging sensor. Since the variable lens imaging sensor optical characteristics are adjustable over a wide range, physical placement of a variable lens imaging sensor is much less restricted than that of a conventional fixed optics imaging sensor.

Figure 10:
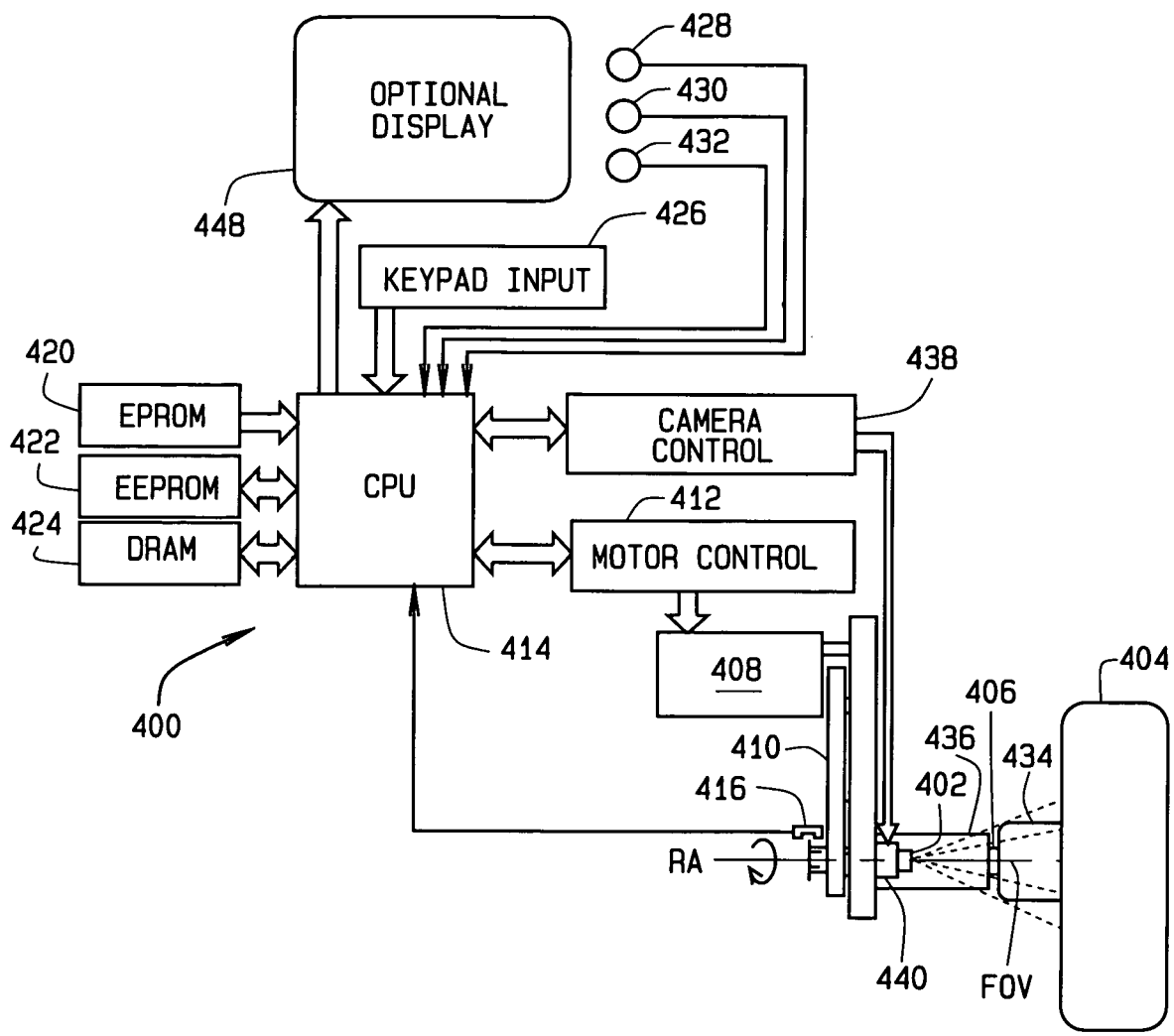
FIG. 10 is a block diagram of components of a vehicle service system incorporating vehicle wheel balancing components, and which is configured with a variable lens optical sensor.

FIG. 10 illustrates the components of a vehicle wheel balancer embodiment 400 of the present invention, configured with a variable lens imaging sensor assembly 402 disposed with a field of view (FOV) encompassing a portion of a vehicle wheel assembly 404 to be balanced. Different placement locations for fixed lens imaging sensors associated with a vehicle wheel balancer system and tire changer system are described in U.S. Patent Application Publication No. 2004-0165180 A1 to Voeller et al., herein incorporated by reference, and may be utilized with the variable lens imaging sensor assemblies 402 of the present invention. The vehicle wheel assembly 404 is mounted on a rotatable mounting shaft or spindle 406, which is driven by a bi-directional, multi-rpm, variable torque motor drive 408, such as through a belt 410. Operation of the motor drive 408 is controlled by a motor control unit 412, in response to signals received from the central processing unit CPU 414. Optionally mounted on one end of the spindle 406 is a quadrature phase optical shaft encoder 416, or other device capable of measuring rotational position, which provides rotational position information to the balancer CPU 414. The CPU 414 is capable of executing the balancer software and driving an optional display 418 or other interface configured to provide information to an operator. The CPU 414 is connected to various electronic memory devices, such as an EPROM program memory 420, EEPROM memory 422 for storing and retrieving non-volatile information such as calibration and vehicle specific specifications, and DRAM memory 424 for temporary data storage. Manual inputs by an operator may be provided via a keypad 426, or optional digital rotary contacting encoders 428, 430, and 432, i.e. knobs.

During the operation of the vehicle wheel balancing system 400, a wheel assembly 404 under test is removably mounted on the spindle shaft 406 for rotation with a spindle hub 434 of conventional design. To determine imbalance of the vehicle wheel assembly 404, the vehicle wheel balancer system 400 may include a pair of force transducers coupled to the balance structure 436. These sensors and their corresponding interface circuitry to the CPU 414 are well known in the art, such as seen in U.S. Pat. No. 5,396,436 to Parker et al., herein incorporated by reference, and thus are not shown.

Additionally shown in FIG. 10 is the inclusion of the camera control logic 438 for the variable lens imaging sensor assembly 402 in communication with the balancer CPU 414 for controlling the operation of an imaging sensor assembly 402, including selection of one or more variable characteristics of the imaging sensor assembly 402. The variable lens imaging sensor assembly 402 is preferably housed in a self-contained housing 440, with a field of view (FOV) orientated towards a desired portion of the wheel assembly 414 mounted on the spindle 406. The housing 440 may be secured to the main structure of the vehicle wheel balancer system 400, as shown in FIG. 10, or may be remotely disposed there from, provided the desired field of view (FOV) is achieved from the position of the housing 440 and associated imaging sensor assembly 402. By incorporating a variable lens, the imaging sensor assembly 402 may be disposed in locations which would generally not be available to a fixed lens imaging sensor assembly, such as at greater distances from the vehicle wheel assembly 404.

Figure 11:
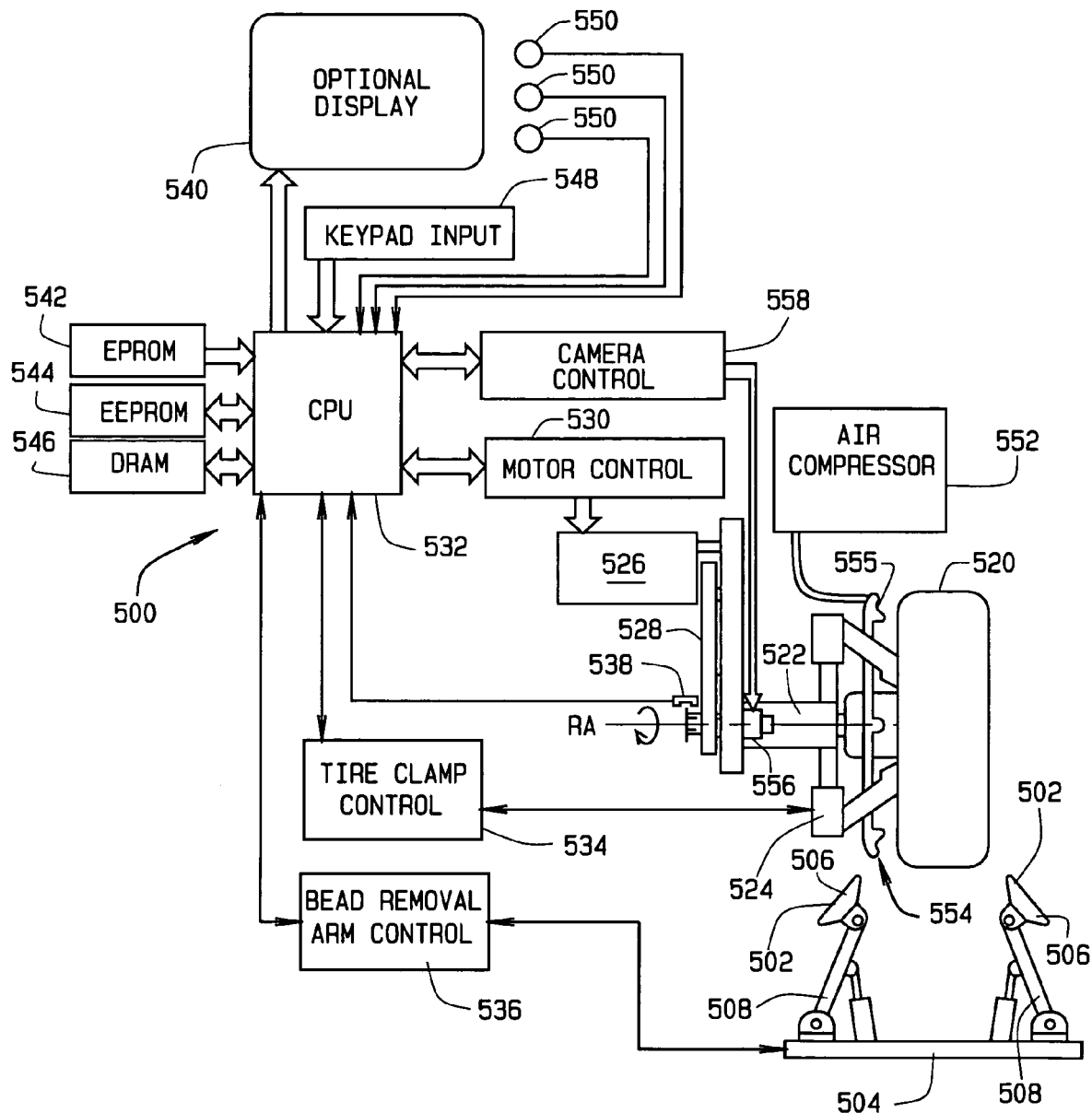
FIG. 11 is a block diagram of a vehicle service system incorporating tire changing system components, and which is configured with a variable lens optical sensor.
Figure 12:
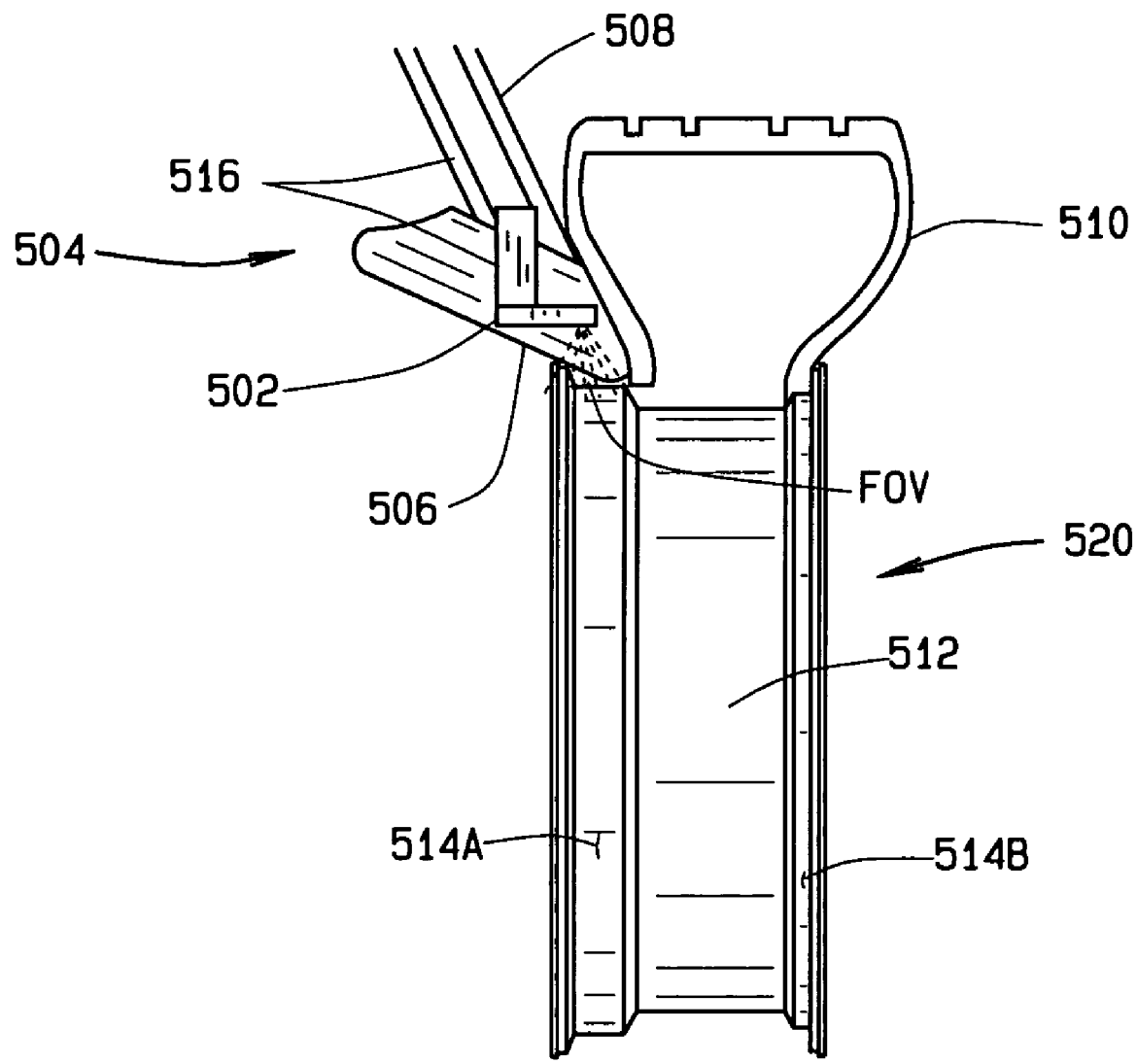
FIG. 12 is a partial cut away view of a vehicle wheel assembly and a tire bead breaker arm, illustrating placement of a variable lens optical sensor on the bead breaker arm for observing the wheel rim bead seat surfaces.

In an alternate embodiment of the present invention a vehicle service system, such as a wheel balancer system 400 or a vehicle tire changing system 500 may be configured with a variable lens imaging sensor 502 operatively coupled to a tire bead removal arm assembly 504 associated with the vehicle service system, as shown in FIGS. 11 and 12. A fluid-lens variable imaging sensor is particularly well suited for this application due to the size restrictions. A tire bead removal arm 504 generally consists of one or more tire bead breakers or bead rollers 506 disposed for rotational movement at an end of an articulating support structures 508. The articulating support structures 508 are typically configured with mechanical, hydraulic, or pneumatic actuating mechanisms (not shown) to engage the bead rollers 506 with the side surface of a tire 510 disposed on a wheel rim 512, disengaging the tire 510 from the wheel rim bead seat 514A, 514B.

As illustrated in FIG. 12, a variable lens imaging sensor assembly 502 associated with the tire bead removal arm 504 is preferably coupled thereto by means of a bracket 516 which positions the variable lens imaging sensor assembly 502 adjacent the bead roller 506. In this configuration, the variable lens imaging sensor assembly 502 is provided with a field of view which includes the upper surface of the wheel rim bead seat 514A as the bead roller 506 displaces the tire 510. Typically, a bead roller 506 will displace a tire 510 two or more inches from the bead seat 514A. Continuous rotation of the tire 510 and wheel rim 512 about the wheel axis as the bead roller 506 displaces the tire 510 from the circumference of the bead seat 514A provides the variable lens imaging sensor assembly 502 with a field of view ultimately encompassing the entire circumferential surface of the bead seats 514A or 514B.

In a tire changing system 500, the vehicle wheel assembly 520 from which a tire 510 is to be mounted or dismounted is secured to a rotating shaft 522 by a set of wheel clamps 524. The shaft 522 is driven by a motor drive 526, such as through a belt 528. Operation of the motor drive 526 is controlled by a motor control unit 530, in response to signals received from a central processing unit (CPU) 532. The CPU 532 similarly controls the operation of the wheel clamps 524 through a tire clamp control unit 534, and the operation of the tire bead removal arms 504 through a bead removal arm control unit 536. Optionally mounted to the shaft 522 is a shaft encoder 538, or similar device, which provides rotational position information to the tire changer CPU 532. The CPU 532 is preferably capable of executing tire changer operations software and driving an optional display 540. The CPU 532 is connected to an electronic memory, such as an EPROM program memory 542, EEPROM memory 544 for storing and retrieving non-volatile information such as vehicle wheel specific specifications, and/or a DRAM memory 546 for temporary data storage. Manual inputs for an operator may include a keypad 548 as well as control pedals 550. Accessory items such as a compressed air inflation assembly 552 and an adjustable tire air inflation ring 554 may be associated with the tire changer system 500 or with a vehicle wheel balancer system 400.

For some tire and rim combinations it is necessary for a vehicle wheel balancer system 400 or tire changer system 500 to use a high pressure blast of air from nozzles 555 of the adjustable tire air inflation ring 544 between the wheel rim 112 and the tire 510 to assist in seating the tire 510 on the bead seat surfaces 514A and 514B. The blast of air causes the tire sidewalls to expand such that the tire 510 makes a seal with the wheel rim 512 close to, if not on, the bead seat surfaces 514A and 514B. This is necessary for filling the wheel assembly 520 with air until the tire 510 is seated into the bead seat surfaces 514A and 514B.

A variable lens imaging sensor assembly 556 mounted to view the vehicle wheel assembly 520 may optionally be utilized to acquire one or more dimensional measurements of the vehicle wheel rim 512 which are subsequently utilized by either the vehicle wheel balancer system 400 or the tire changer system 500 to determine a need for an air blast from the adjustable tire air inflation ring 544 during tire inflation, or to alter the position or orientation of the individual nozzles 555 on the tire air inflation ring 544 to accommodate wheel rims 512 of different sizes. The operation of the variable lens imaging sensor assembly 556, as well as the operation of any variable lens imaging sensor assemblies 502 associated with a bead breaker arm assembly 504, may be controlled through a camera control logic circuit 558 operatively coupled to the CPU of the vehicle wheel balancer 400 or the tire changer system 500.

As various changes could be made in the above constructions without departing from the scope of the invention, it is intended that all matter contained in the above description or shown in the accompanying drawings shall be interpreted as illustrative and not in a limiting sense.

The invention claimed is:

1. An improved vehicle service system having a processing system and at least one imaging sensor operatively coupled to the processing system for acquiring images associated with a vehicle component, the improvement comprising:
    wherein the at least one imaging sensor includes at least one variable lens assembly having at least one selectively alterable optical characteristic;
    wherein said at least one imaging sensor is configured to acquire, through said at least one variable lens assembly, a first image associated with a field of view during a vehicle service procedure;
    wherein said at least one imaging sensor is configured to alter said optical characteristic of said at least one variable lens assembly during said vehicle service procedure; and
    wherein said at least one imaging sensor is configured to acquire, through said at least one variable lens assembly having an altered optical characteristic, at least a second image, said second image associated with an altered field of view.

2. The improved vehicle service system of claim 1 wherein the vehicle service system is a vehicle wheel alignment system.

3. The improved vehicle service system of claim 1 wherein the vehicle service system is a vehicle wheel balancing system.

4. The improved vehicle service system of claim 1 wherein the vehicle service system is a tire changing system.

5. The improved vehicle service system of claim 1 wherein said variable lens assembly includes at least one fluid-lens component.

6. The improved vehicle service system of claim 5 wherein said at least one imaging sensor is configured to alter said field of view by altering a fluid-lens component.

7. The improved vehicle service system of claim 1 further including a control means operatively coupled to said at least one imaging sensor for directing said alteration of said at least one alterable optical characteristic of said at least one variable lens assembly.

8. The improved vehicle service system of claim 1 wherein said alterable optical characteristic is said field of view; and
    wherein said at least one imaging sensor is configured to alter said field of view by altering a configuration of said variable lens assembly.

9. The improved vehicle service system of claim 1 wherein said alterable optical characteristic is said field of view; and
    wherein said at least one imaging sensor is configured to selectively transition said field of view between a wide field of view and a narrow field of view during a vehicle service procedure.

10. The improved vehicle service system of claim 1 wherein said alterable optical characteristic is an image focus.

11. The improved vehicle service system of claim 1 wherein said alterable optical characteristic is a depth of field.

12. The improved vehicle service system of claim 1 wherein said alterable optical characteristic is a focal length.

13. The improved vehicle service system of claim 1 wherein said at least one variable lens assembly is a zoom lens.

14. An improved vehicle service system having a processing system and at least one imaging sensor operatively coupled to the processing system for acquiring images associated with a vehicle component, the improvement comprising:
    wherein the at least one imaging sensor includes at least one variable lens assembly having at least one selectively alterable optical characteristic;
    wherein said at least one imaging sensor is configured to acquire, through said at least one variable lens assembly, a first image associated with a field of view during a vehicle service procedure;
    wherein said at least one imaging sensor is configured to alter said optical characteristic of said at least one variable lens assembly during said vehicle service procedure;
    wherein said at least one imaging sensor is configured to acquire, through said at least one variable lens assembly having an altered optical characteristic, at least a second image, said second image associated with an altered field of view; and
    wherein said alterable optical characteristic is an optical axis.

15. An imaging sensor for use with a vehicle service system, comprising:
    a photoreceptor array responsive to incident radiation reflected from at least one vehicle component within a field of view to generate an image of said field of view;
    at least one variable lens optical element disposed along an optical path between said photoreceptor array and said at least one vehicle component, said at least one variable lens optical element defining said field of view; and
    a processor operatively coupled to said at least one variable lens optical element and to said photoreceptor array to selectively alter a characteristic of said at least one variable lens optical element between the generation of a first image and at least one subsequent image in response to directions from a vehicle service software application during a vehicle service procedure.

16. The imaging sensors of claim 15 wherein said at least one variable lens optical element is a fluid-lens optical element.

17. The imaging sensor of claim 15 wherein said processor is configured to alter said field of view of said at least one variable lens optical element.

18. The imaging sensor of claim 15 wherein said processor is configured to alter a depth of field of said at least one variable lens optical element.

19. The imaging sensor of claim 15 wherein said processor is configured to alter a focus of said at least one variable lens optical element.

20. The imaging sensor of claim 15 wherein said processor is configured to alter a focal length of said at least one variable lens optical element.

21. The imaging sensors of claim 15 wherein said at least one variable lens optical element is a zoom lens.

22. An imaging sensor for use with a vehicle service system, comprising:
- a photoreceptor array responsive to incident radiation reflected from at least one vehicle component within a field of view to generate an image of said field of view;
- at least one variable lens optical element disposed along an optical path between said photoreceptor array and said at least one vehicle component, said at least one variable lens optical element defining said field of view;
- a processor operatively coupled to said at least one variable lens optical element and to said photoreceptor array to selectively alter a characteristic of said at least one variable lens optical element between the generation of a first image and at least one subsequent image in response to directions from a vehicle service software application during a vehicle service procedure; and
- wherein said processor is configured to alter an optical axis of said at least one variable lens optical element.

23. An improved vehicle wheel alignment system having a processing system and at least two alignment sensors attached to the wheels of a vehicle, the alignment sensors being operatively coupled to the processing system for acquiring alignment angle data associated with a vehicle, the improvement comprising:
- wherein each of the alignment sensors includes at least one imaging sensor configured with a first variable lens optical element for acquiring images, said first variable lens optical element configured to respond to the processing system to selectively alter an optical characteristic of said at least one imaging sensor between the acquisition of at least two images during a vehicle service procedure; and
- wherein each of the alignment sensors further includes at least one optical emitter configured with a second variable lens optical element, said second variable lens optical element configured to respond to the processing system to alter a characteristic of optical energy emitted by said associated alignment sensor during a vehicle service procedure.

24. An improved vehicle service system having a processing system and at least one variable lens imaging sensor operatively coupled to the processing system for acquiring images associated with a vehicle component during a vehicle service procedure, the improvement comprising:
- a control means configured to alter at least one variable characteristic of the variable lens imaging sensor during a vehicle service procedure between the acquisition of a first image and at least one subsequent image associated with the vehicle component present in a field of view of the variable lens imaging sensor.

25. The improved vehicle service system of claim 24 wherein said at least one variable characteristic is a mechanical configuration of the variable lens imaging sensor.

26. The improved vehicle service system of claim 24 wherein said control means is configured to alter an electrical signal supplied to said variable lens imaging sensor; and wherein said variable characteristic of said variable lens imaging sensor is responsive to said supplied electrical signal.

27. The improved vehicle service system of claim 24 wherein said at least one variable characteristic is a zoom setting of the variable lens imaging sensor.

* * * * *